US009330371B2

(12) United States Patent
Licata et al.

(10) Patent No.: US 9,330,371 B2
(45) Date of Patent: May 3, 2016

(54) METHOD OF PROCESSING DOCUMENTS RELATING TO SHIPPED ARTICLES

(75) Inventors: Loic Licata, Villeurbanne (FR); Florian P. Cimetiere, Lyons (FR); Sylvain N. Valette, St. Geoire en Valdaine (FR); Julien Fiette, St Geoire en Valdaine (FR)

(73) Assignee: ITINSELL, Lyons (FR)

( * ) Notice: Subject to any disclaimer, the term of this patent is extended or adjusted under 35 U.S.C. 154(b) by 245 days.

(21) Appl. No.: 13/504,147

(22) PCT Filed: Oct. 28, 2010

(86) PCT No.: PCT/FR2010/052319
§ 371 (c)(1),
(2), (4) Date: Jul. 5, 2012

(87) PCT Pub. No.: WO2011/051630
PCT Pub. Date: May 5, 2011

(65) Prior Publication Data
US 2012/0271850 A1    Oct. 25, 2012

(30) Foreign Application Priority Data
Oct. 28, 2009   (FR) .................................... 09 57582

(51) Int. Cl.
G06F 17/30    (2006.01)
G06Q 10/08    (2012.01)
G06Q 10/06    (2012.01)

(52) U.S. Cl.
CPC .............. *G06Q 10/08* (2013.01); *G06Q 10/06* (2013.01)

(58) Field of Classification Search
USPC ....................... 707/758, 779, 708; 705/1, 400
See application file for complete search history.

(56) References Cited

U.S. PATENT DOCUMENTS 5,180,309 A *   1/1993   Egnor ........................... 434/323
6,263,121 B1    7/2001   Melen et al.
(Continued)

FOREIGN PATENT DOCUMENTS

JP    A-2003-216624    7/2003
JP    A-2003-271829    9/2003
(Continued)

OTHER PUBLICATIONS

Eirund et al., "Knowledge Based Document Classification Supporting Integrated Document Handling," *Conference on Office Information Systems*, Palo Alto, Mar. 23-25, 1988, pp. 189-196, XP-000757444, IEEE, New York.
(Continued)

*Primary Examiner* — Hung T Vy
(74) *Attorney, Agent, or Firm* — Oliff PLC

(57) ABSTRACT

In the method of processing documents relating to shipped articles, automatic means execute the following steps: performing character recognition in at least one document made available by a carrier of the articles; obtaining at least one article reference made up of characters; obtaining at least one character string associated with the reference and distinct therefrom; calculating respective match percentages between the string and templates in a database; determining whether at least one of the percentages satisfies at least one predetermined condition; and when the condition is satisfied, associating the article reference with a template of the database relating to said percentage, and executing an action concerning the article reference by means of the associated template.

16 Claims, 7 Drawing Sheets

(56) References Cited

U.S. PATENT DOCUMENTS

| | | | |
|---|---|---|---|
| 7,333,936 B2* | 2/2008 | Holoubek | 705/60 |
| 2002/0059161 A1* | 5/2002 | Li | 707/1 |
| 2002/0107735 A1* | 8/2002 | Henkin et al. | 705/14 |
| 2003/0101163 A1* | 5/2003 | Lui et al. | 707/1 |
| 2003/0177090 A1 | 9/2003 | Eden | |
| 2003/0236680 A1* | 12/2003 | Holoubek | 705/1 |
| 2004/0178128 A1* | 9/2004 | O'Connell et al. | 209/584 |
| 2005/0144184 A1* | 6/2005 | Carus et al. | 707/101 |
| 2006/0123338 A1* | 6/2006 | McCaffrey et al. | 715/531 |
| 2007/0073745 A1* | 3/2007 | Scott et al. | 707/100 |
| 2007/0118506 A1* | 5/2007 | Kao et al. | 707/3 |
| 2007/0136251 A1* | 6/2007 | Colledge et al. | 707/3 |
| 2007/0147659 A1* | 6/2007 | Eremita et al. | 382/101 |
| 2008/0104052 A1* | 5/2008 | Ryan et al. | 707/5 |

FOREIGN PATENT DOCUMENTS

| | | |
|---|---|---|
| JP | A-2004-26423 | 1/2004 |
| JP | A-2006-279545 | 10/2006 |

OTHER PUBLICATIONS

Mar. 11, 2011 International Search Report issued in International Patent Application No. PCT/FR2010/052319 (with translation).
Notice of Rejection dated Apr. 8, 2014 from Japanese Patent Application No. 2012-535907 (with English-language translation).

* cited by examiner

METHOD OF PROCESSING DOCUMENTS RELATING TO SHIPPED ARTICLES

FIELD OF THE INVENTION

The invention relates to processing documents relating to shipped articles.

BACKGROUND OF THE INVENTION

It is conventional for a purchaser to acquire an article remotely and for the seller to delegate the task of routing the article to the purchaser to a carrier. Often, the seller, for lack of time or means, does not monitor proper routing of the article, such that it is the purchaser who informs the seller in the event of an incident concerning delivery, should that happen. Thus, a purchaser, on observing that a delivery is running late, becomes worried or dissatisfied and makes contact with the seller. On being alerted by the purchaser, the seller can make inquiries with the carrier. Nevertheless, the procedure is lengthy. In particular, it requires contact to be made with the carrier concerning each anomaly and it requires each complaint to be tracked until it has been dealt with. With the carrier, an inquiry is not launched unless such an alert is received, and such an inquiry may then take several weeks. During this time, the purchaser must either wait for the carrier to find a solution before receiving the package eventually, assuming that it has not been permanently lost. Under such conditions, and most of the time, such a delivery problem leads to the purchaser being disappointed, to the seller needing to send a complaint to the carrier, and to the carrier having no solution immediately available.

It is indeed possible to entrust the analysis of the carrier's documents to one or more people so that they can determine what action needs to be triggered for each of the documents. However people find such an analysis stage to be repetitive, in particular when documents are handled as though on an assembly line, which is necessary in order to give precedence to short reaction times. The redundant nature of the task leads to a high risk of error in analyzing documents and in deciding on the actions to be undertaken. By way of example, such an error may involve misreading or misinterpreting a document.

OBJECT AND SUMMARY OF THE INVENTION

An object of the invention is to make it easier to solve delivery problems, if any.

To this end, the invention provides a method of processing documents relating to shipped articles, wherein automatic means execute the following steps:
  performing character recognition in at least one document made available by a carrier of the articles;
  obtaining at least one article reference made up of the characters;
  obtaining at least one string of the characters associated with the reference and distinct therefrom;
  calculating respective match percentages between the string and templates in a database;
  determining whether at least one of the percentages satisfies at least one predetermined condition; and
  when the condition is satisfied, associating the article reference with a template in the database relating to said percentage, and executing an action concerning the article reference by means of the associated template.

Thus, the invention makes it possible to determine in a very short length of time whether the information given in the document and relating to the package corresponds to a situation that said means have already encountered beforehand, and where appropriate to execute immediately the proper action given that situation. These operations may be performed in bulk on a large number of documents with the appropriate action being executed for each of the documents.

The method makes it possible to mitigate the risk of error that is inherent in people processing documents and that results from the repetitive nature of the task.

It is indeed possible for a person to remember or have available a certain number of typical situations from which that person can determine the situation applicable to the document being studied. However, regardless of whether these situations are remembered or embodied by documents to which the person can refer, comparing the document that is being analyzed with any one of these situations is particularly time consuming. In addition, although a person can refer to a few tens of templates, it becomes physically much more difficult, if not impossible, for such a person to refer to several hundreds or several thousands of templates. In contrast, the method of the invention makes it possible without difficulty to compare the document with a very large number of templates. It can therefore provide a reply that is appropriate in a very wide variety of situations.

Consequently, not only does the method of the invention provide a saving in time by executing its steps automatically, it also reduces the risks of error and enables the document to be compared with a very large number of situations.

Advantageously, the automatic means execute a step of comparing the document with at least two predetermined document types, and when a predetermined condition concerning the document types is satisfied, it performs a step of associating the document with one of the types.

Thus, the automatic means detect the type of the document that is to be processed and can therefore immediately apply processing steps that are appropriate to that type of document for better efficiency. This implementation also has the advantage of avoiding any need to sort the documents that are being subjected to processing by the automatic means. The automatic means can handle documents of different types that are not classified by type, and for each document the automatic means detect the type to which it belongs.

Depending on circumstances, provision may be made for recognition to be performed:
  in a text, the string preferably comprising several sentences;
  in a data table; and/or
  in an image.

Preferably, when the string includes at least one word or group of words of a predetermined so-called "non-pertinent" type, the automatic means eliminate the word or the group of words from the string before calculating the percentages.

Thus, before the step of calculating the percentages it is possible to eliminate words or groups of words that might be liable to cause the method to be executed wrongly. By way of example, these may be names, forenames, addresses, dates, etc. Once these words or groups of words have been deleted from the string, the purged string that results therefrom gives much better results when calculating the match percentages. In order to perform this implementation, provision may be made for the automatic means to compare the string with words or groups of words of a predetermined type stored in the database, and if one of the words or groups of words is found in the string, then the word or group is deleted from the string. When the words or groups of words in the database are said to be of a "predetermined type", that means for example that they are associated with a specific category of data, with only data of that category being taken into account at this step.

Advantageously, for each template, the automatic means calculate the match percentage only when the string does not include any word or group of words of a so-called "forbidden" predetermined type associated with the template.

This avoids confusion between certain templates that would otherwise be too similar to one another, thereby giving rise to the required match percentage together with a major contradiction. Consequently, the risks of a document being associated with an unsuitable template are reduced.

Advantageously, when the string includes at least one word or group of words of a predetermined so-called "preferred" type, the automatic means increase at least one of the percentages prior to performing the determination step.

This implementation thus makes it possible to give bonus points if such and such a "preferred" word or group of words is present in the string. For example, these may be words such as "invoice", "deadline", etc. By way of example, if such a word is detected, provision may be made to increase the percentage associated with each of the templates in the database that include the word in question. It is thus considered that the presence of such a word constitutes a matching element that is characteristic or particularly strong between the string and the template under consideration. By way of example, the search for preferred words may be performed in the same manner as the above-described search for non-pertinent words.

Advantageously, the condition or one of the conditions is that the percentage exceeds a predetermined threshold.

In this implementation, the automatic means thus determine whether at least one of the percentages exceeds a threshold that constitutes a minimum. This means that if a match percentage is below the minimum, it is considered as being too low for any serious match to be found with the template in question. If all of the calculated percentages are below the threshold, provision may be made for the processing of the string by the automatic means to be stopped and for human intervention to be required in order to determine what operations are then to be performed on the string. If one of the calculated percentages or a plurality of them are greater than the threshold, it is only that one or those percentages that are taken into account for subsequent processing by the automatic means.

Advantageously, the condition or one of the conditions is that the percentage is greater than the other percentages.

In this implementation, the template selected from the database for associating with the string is the template that corresponds to the highest percentage that is obtained. It is thus the template that most resembles the string. Preferably, the two above-mentioned conditions are combined. Provision may thus be made for the most similar template to be selected from only those percentages that have exceeded the threshold. Provision may also be made for no template to be selected if none of the percentages exceeds the threshold.

Preferably, the templates in the database comprise main templates and secondary templates, each secondary template being associated with a single respective one of the main templates and each containing only some of the characters of the main template with which it is associated, and when a match percentage between the string and one of the secondary templates satisfies the condition, the association comprises associating the article reference with the main template with which the secondary template is associated.

Thus, the secondary templates are those that are particularly similar to the corresponding main template. When the automatic means determine that the most similar template is a secondary template, they associate the string under study with the corresponding main template. This implementation serves to limit failures in identifying a template that resembles the string. It also makes it possible to build on past experience. If a certain type of string is frequently encountered and if it is considered as being similar to a main template, it may be recorded as a secondary template. Under such conditions, when this type of string is encountered another time, it presents a particularly high match percentage with the newly recorded secondary template. It can thus be associated with the main template with a particularly low risk of error.

Advantageously, when the condition or at least one of the conditions is not satisfied, the automatic means record the string in the database as a template, preferably as a main template or as a secondary template.

Thus, in particular in the event of the automatic means failing to process the string, the string may be recorded in the database as a main template or a secondary template. As mentioned above, such recording is advantageous when the string in question is one that occurs frequently.

The invention also provides a computer program that includes code instructions suitable for controlling the execution of a method of the invention when it is executed on a computer.

The invention also provides a data recording medium including such a program in recorded form.

The invention also provides for making such a program available for downloading from a telecommunications network.

The invention also provides a device for processing documents, which device comprises automatic means suitable for:
  recognizing characters in at least one document;
  obtaining at least one article reference made up of the characters;
  obtaining at least one string of the characters associated with the reference and distinct therefrom;
  calculating respective match percentages between the string and templates in a database;
  determining whether at least one of the percentages satisfies at least one predetermined condition; and
  when the condition is satisfied, associating the article reference with a template of the database relating to said percentage, and executing an action concerning the article reference by means of the associated template.

The invention also provides a database relating to shipped articles, which database comprises a data medium including in recorded form:
  article references made up of characters, and also
  templates comprising strings of characters and made up of main templates and of secondary templates, each secondary template being associated with a single respective one of the main templates and each including only a portion of the characters of the main template with which it is associated.

Finally, the invention provides an assembly comprising a device of the invention and a database of the invention.

The invention may be implemented in a method of monitoring shipped articles, wherein:
  an automatic system analyzes together data from a sender of the articles, the data relating to the articles, and data from a carrier of the articles, the data also relating to the articles; and
  when the analysis leads to a predetermined result, the system performs an action.

Thus, the analysis enables data from the sender to be compared with data from the carrier in order to detect any anomaly early. Usually, such early detection takes place before the purchaser becomes aware of the slightest problem. Furthermore, it can sometimes make it possible to trigger an inquiry with the carrier very early on. The carrier can then examine the anomaly in question immediately and attempt to remedy it. Under such circumstances, the sooner an anomaly is detected, the easier it is to provide a solution to that anomaly. In particular, if an article has gone astray, has followed a wrong route, or is waiting in some given location for some unexplained reason, it is that much easier to remedy the problem when the problem is detected early. In some circumstances, it is even possible to solve the problem before the purchaser becomes aware of an anomaly such as lateness.

Advantageously, the system receives and/or imports data from the sender and/or data from the carrier.

Preferably, prior to analysis, the system determines whether at least some of the data satisfies at least one predetermined criterion, and if not the system indicates that the data is out of compliance.

Thus, this stage of preliminary verification reduces the risk of taking erroneous data into account, thereby improving the reliability of the analysis performed subsequently.

Advantageously, the system renews its analysis periodically, e.g. once per day.

Thus, frequent comparison of data from the sender and data from the carrier makes it possible to detect very early any anomaly and thus to resolve it that much more easily and quickly.

Preferably, the analysis is performed in such a manner as to determine whether at least one of the articles has or has not been delivered.

Thus, the method makes it possible to continue analysis in different directions depending on circumstances.

Preferably, the analysis is performed in such a manner as to determine whether, for each delivered article, the delivery time exceeds a predetermined threshold.

Thus, it is detected when an announced delivery time is exceeded.

Preferably, the analysis is performed so as to determine whether at least one of the articles has been waiting for delivery for a period that exceeds a predetermined threshold.

Thus, the analysis makes it possible in particular to detect whether an article has remained waiting in a given location for a period that is abnormally long.

Preferably, the analysis is performed in such a manner as to determine whether an amount that has been invoiced by the carrier exceeds a predetermined threshold.

This serves to detect an anomaly in invoicing by the carrier. It can often happen that a carrier once informed of an invoicing anomaly applies a lower rate or makes a reimbursement.

Preferably, the action comprises preparing and/or sending a message to the carrier, with the message containing, for example, sender data and carrier data relating to at least one of the articles.

Thus, the method implements automatic preparation of a message such as a complaint message. The sender therefore does not need to prepare the complaint.

Preferably, the system makes means available to the sender of the article suitable for confirming or indeed triggering the sending of a message to the carrier.

There thus exists a procedure for prior confirmation of messages by the sender of the article.

Advantageously, the system analyses a reply to the complaint as made by the carrier and then preferably extracts a text from the reply.

By way of example, it is at this point that the above-described method of the invention takes place. Thus, the reply made by the carrier is compared with existing data so that a quick response can be prepared, should that be necessary.

Preferably, the system makes at least one document such as a web page available from a telecommunications network, the document containing data from the sender and data from the carrier relating to at least one of the articles, and the system preferably makes a plurality of documents available, each relating to a single respective article.

Thus, this document, which is available to the sender and/or to the purchaser, makes it possible at any time to take cognizance of data relating to the article, such as data relating to its routing state, the possible existence of a complaint made to the carrier, or indeed the reply sent by the carrier, etc.

The invention also provides a monitoring system for tracking shipped articles, the system comprising means suitable for:
  combined analysis of data from a sender of the articles and relating to the articles, with data from a carrier of the articles, and also relating to the articles; and
  when the analysis leads to a predetermined result, performing an action.

Finally, the invention provides a web page relating to at least one shipped article, the web page containing at least the following data organized in joint manner on the page:
  at least one item of data from a sender of the article and relating to the article; and
  at least one item of data from the carrier of the article, and also relating to the article.

BRIEF DESCRIPTION OF THE DRAWINGS

Other characteristics and advantages of the invention appear further from the following description of an implementation given by way of non-limiting example with reference to the accompanying drawings, in which.

MORE DETAILED DESCRIPTION

Figure 1:
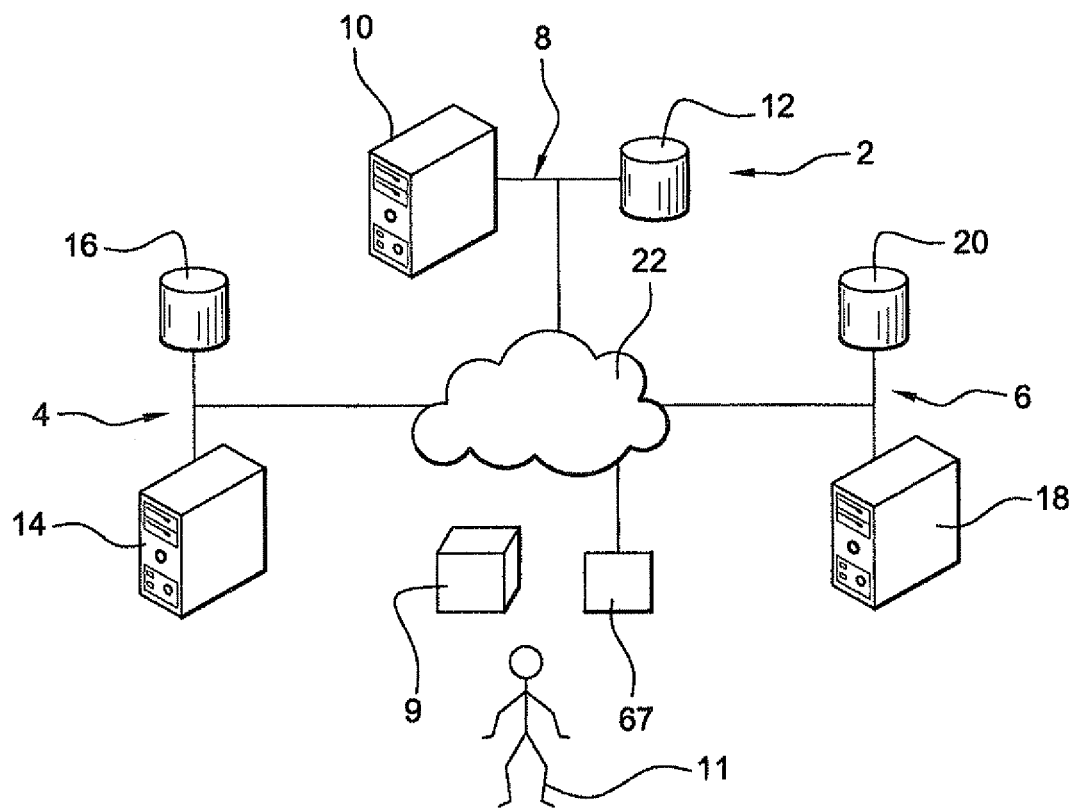
FIG. 1 is a diagram of the various parties participating in implementing the method of the invention.

With reference to FIG. 1, the method of the invention in the present implementation is used for monitoring the routing of articles such as packages or indeed letters. It is implemented mainly by an entity such as a company or an organization referred to herein as a "controller" 2. It also involves a seller 4, e.g. likewise constituted by a company or an organization, and a carrier 6.

It is assumed that the seller 4 has initially sold an article 9 by correspondence to a purchaser 11. The seller 4 entrusts the article in the form of a package to the carrier 6 for shipping to the address of the purchaser.

The controller 2 comprises a system 8 having one or more devices 10 such as computers, e.g. forming servers, and one or more databases 12 connected to the computers 10 in order to communicate therewith. The seller 4 has an analogous installation comprising one or more computers 14 and one or more databases 16, and likewise the carrier 6 has one or more computers 18 and one or more databases 20. These members include computer means such as microprocessors, memories, clocks, etc. that enable them to operate in the manner described below. The parties 2, 4, and 6, and thus these members, are interconnected by means of a telecommunications network 22, e.g. of the TCP/IP (transmission control protocol/internet protocol) type, such as the Internet. The seller 4 in this example is a client of the controller 2 for the services relating to the method.

The steps of the method of the invention are described below, it being understood that each of the above-mentioned elements is, if necessary, configured and suitable for implementing the steps. In particular, each of the servers includes in recorded form one or more programs including code instructions suitable for controlling the execution of one or more steps of the method when executed on the server. These programs may be recorded on a data recording medium such as a hard disk, a flash memory, etc. The same programs may also be made available, e.g. on the network 22, for downloading purposes.

The method enables the seller 4 to track in detailed manner the delivery of the package 9, from the package being picked up by the carrier 6 until its final delivery to the purchaser 11. The method also makes it possible to process any anomalies in shipping, such as lateness, failure to deliver within a certain time, damaged or spoiled package. Another type of anomaly lies in the package being returned to the sender 4 on the alleged grounds that the recipient does not live at the specified address, the carrier 6 finding that the recipient is not at this address (NATA). It may thus happen that the delivery address is wrong or that the carrier has made a mistake. There is an anomaly when such a return is not justified. The idea is to increase the satisfaction of sellers 4 and above all of purchasers 11 while also increasing routing productivity.

Figure 2:
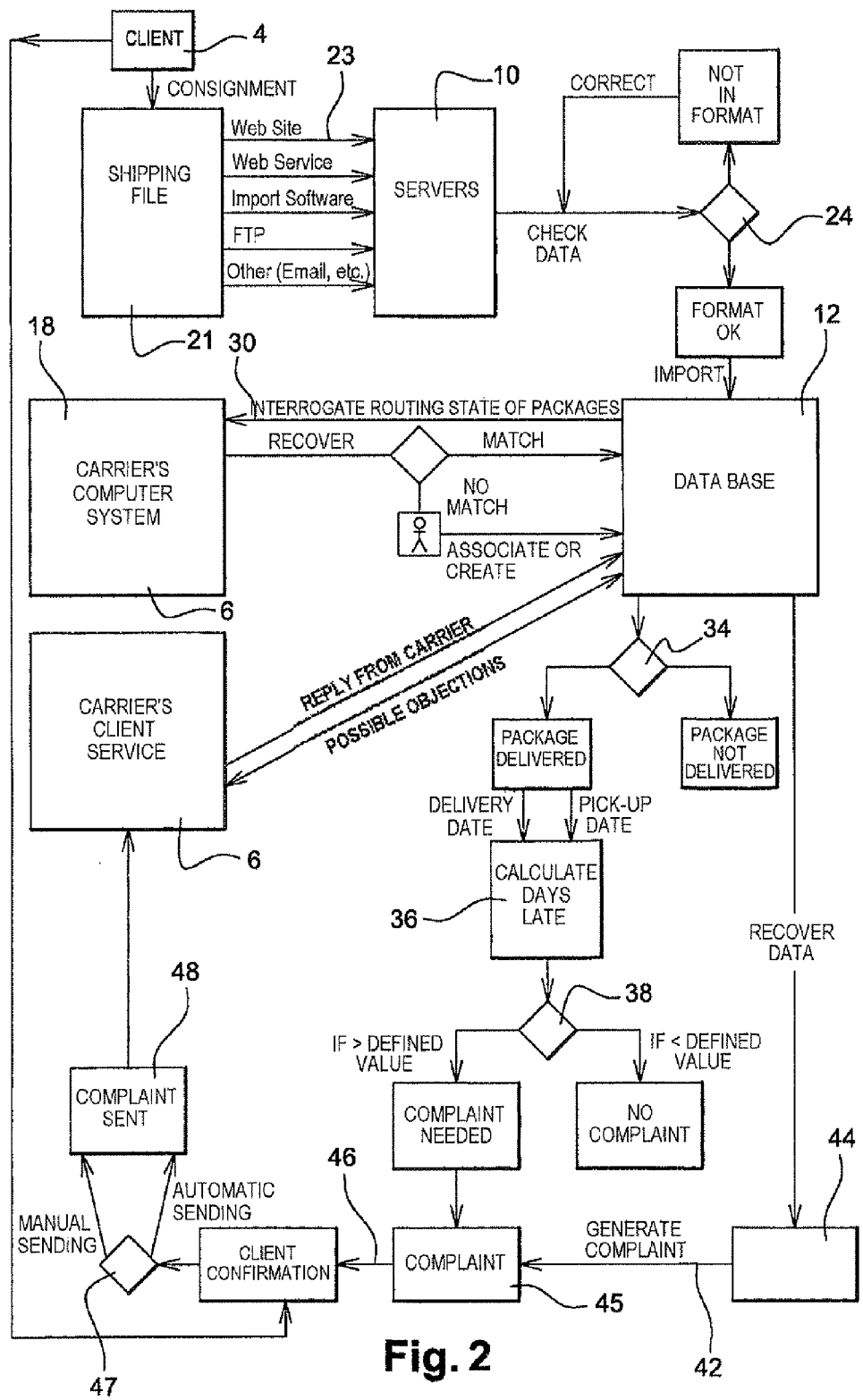
FIG. 2 is a flow chart showing how the method of the invention runs in order to identify a delivery that is too late.

With reference to FIG. 2, in a first step 23, the server 10 obtains from the client 4 over the network 22 data concerning all of the shipments entrusted to the carrier. This data acquisition may be performed in various ways. The seller 4 may transmit a data file 21 containing the data on line to the server 10. The file 21 may be made available on an Internet site of the controller 2, e.g. using an appropriate sending form. The data may be sent using software specifically designed for co-operating with software of the carrier 6. Data may be delivered using a file transfer protocol (FTP), where this term designates a communications protocol for exchange of computer files over a TCP/IP network. Whatever the technique used, it is advantageous for the file 21 to present a header line and separators of a predetermined type, and for it to incorporate all of the fields available in the carrier's software.

During a following step 24, the server 10 checks the data as obtained in this way prior to importing it into the database 12. In this respect, it is useful to have determined criteria that need to be satisfied by the transmitted data before that data is incorporated. By way of example, these may comprise format criteria such as the number of alphanumeric characters that an item should contain. If any one of these criteria is not satisfied, e.g. if a data item has some number of alphanumeric characters other than the number specified by the criterion, the server 10 indicates that the item presents such an anomaly, and isolates it, while mentioning it in a list. The list is consulted by a person who modifies or corrects the data item in question in order to eliminate the anomaly. Specifically, the data items associated with each package 9 need to satisfy the following criteria:

- a package number with a predetermined number of digits, e.g. 13;
- the name and the forename of the recipient for delivery are available;
- the delivery address has a post code made up of a predetermined number of digits, e.g. six;
- the date at which the carrier 6 picked up the guide means from the seller 4, the date being expressed in a predetermined format (e.g. of the type "dd/mm/yyyy");
- a telephone number is provided having at least 20 characters; and
- a contact number is provided that corresponds to the client in question.

The seller data, when considered valid, possibly after being corrected, is recorded by the system 8 in the database 12 of the controller 2.

In a following step 30, the server 10 obtains data from the carrier 6 relating to the transported packages 9. For example, for each package it recovers the routing data, in particular the routing state available from the carrier's information system 18. Specifically, in this example, during a step 30, the server 10 interrogates the system 18 to obtain the data in question and, during a step 32, it imports this data. A method of obtaining and processing routing states in the context of the method is described below.

This carrier data is also recorded in the database 12. It is also possible to make provision for prior steps of checking and modifying or correcting this data. The database thus has data about the packages 9 coming from the seller 4 and data about the same packages coming from the carrier 6.

The system 8 then proceeds to analyze the data. The above-described steps of obtaining data are performed periodically, e.g. once every day, or indeed several times a day. Once the data is in the database, the analysis as described below is performed. This analysis thus also takes place periodically and preferably once every day or indeed several times a day.

The following analysis is performed for each of the packages in succession.

During a step 34, the server 10 determines whether the package has been delivered. Here the delivery concerned is the first presentation of the package by the carrier to the home of the purchaser. If the purchaser takes delivery of the package, then that is the final delivery, i.e. the package has indeed been taken by the purchaser 11. Otherwise, that constitutes an intermediate delivery, the carrier having called on the purchaser's home without being able to reach the purchaser.

If the package has been delivered, the server 10 acts in a step 36 to determine whether the delivery took place out of time. To do this, the server specifically calculates a period R expressed in days using the following method:

$R$=delivery date−pickup date−number of non-working days over the period in question.

Thus, the difference between the delivery date and the pickup date makes it possible to obtain a duration from which the number of non-working days is subtracted.

Since certain clients have logistics problems, it is not possible to rely on declared data in spite of numerous inspections performed in the context of the method. Under such circumstances, and in order to avoid opening erroneous complaints, when performing the calculations relating to inquiries and to an out-of-time situation, it is not the partial pickup date that is used but the date of the first routing state. This makes it possible to rely solely on data from the carrier. Since such data is not very reliable, in particular in terms of the pickup date of the goods, that automatically reduces the number of complaints, but it does enable the delivery process to be tracked. This method makes it possible to avoid impeding the carrier's service which would otherwise be faced with a large number of ill-founded complaints because of client logistics problems and unreliable data transmitted to the controller.

During a step 38, the server 10 determines whether the value R is greater than a predetermined threshold, e.g. a function of a parameter for the package concerned, such as the type of package. If the answer is yes, then the delivery is considered as taking place out of time, thereby triggering the preparation and the sending of a complaint in the manner described below. Otherwise, the complaint is not triggered.

Figure 3:
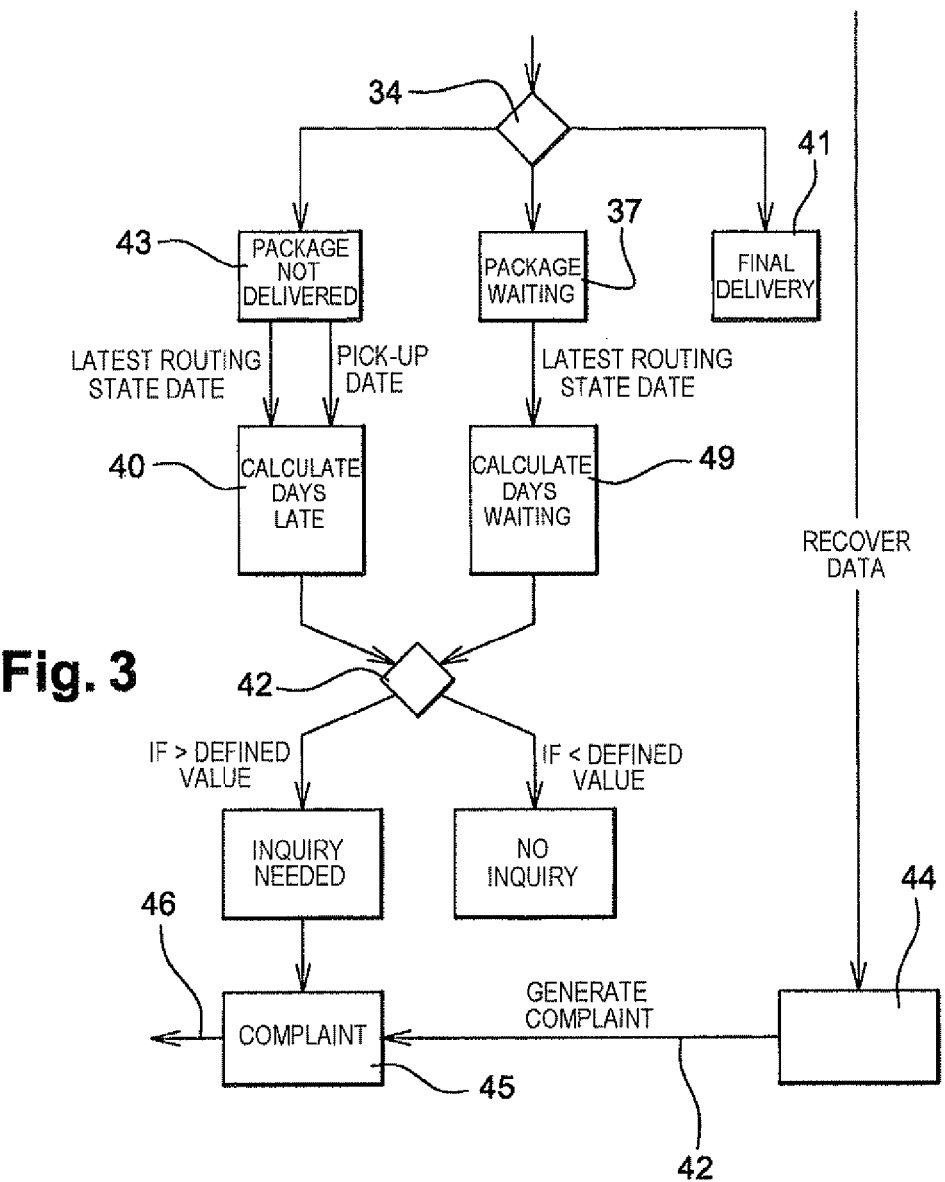
FIG. 3 is a portion of the FIG. 2 flow chart showing other steps.

With reference to FIG. 3, if the final delivery has not yet taken place, an attempt is made to determine whether the package was the subject of an intermediate delivery a certain length of time ago, without any other event happening subsequently. It is thus possible, where appropriate, to detect that the package is no longer advancing in the routing circuit, which is abnormal, and consequently to take action concerning this situation. The term "waiting package" is thus used herein to designate routing states in which the package has already been the subject of a first presentation to the recipient.

In step 34, the system thus determines the category in which the package is to be found from the following three categories:

a package for which final delivery 41 has taken place;
  a waiting package 37: the package has already been the subject of a first presentation to the recipient. No final delivery took place and the package is waiting somewhere (e.g. at premises where the purchaser can withdraw it). This applies for example when there is provision for the package to be presented a second time; and
  package not delivered 43 but not waiting: the package is continuing to be routed. For example it might be being prepared so that it can be delivered.

Under such circumstances, the system performs a calculation 40 of a period R as follows:

$$R = \text{today's date} - \text{pickup date} - \text{number of non-working days in the period in question.}$$

This thus calculates the number of working days that have elapsed since the package was picked up by the carrier.

If in step 37 the package is waiting, e.g. after the purchaser has been informed that the carrier has called a first time, the server 10 acts in the following step 49 to estimate the number of days for which the package has been waiting. The system performs the calculation 40 to determine a period R as follows:

$$R = \text{today's date} - \text{pickup date} - \text{number of non-working days in the period concerned} + \text{a constant.}$$

The constant is selected as a function of a parameter for the package or for the transporter, for example it may have one of the following values: 4, 8, or 20. By way of example, it is selected as a function of the type of routing service that applies to the package. This therefore amounts to performing the same calculation as above, but while adding the constant to the result.

Either way, if during the following step 42 the result of the calculation exceeds a predetermined threshold, the server 10 determines that the situation requires an inquiry and it prepares a complaint. If the result does not exceed said value, then the server does not prepare a complaint.

Provision may be made for the threshold that is taken into account to depend on a characteristic of the package, for example a package parameter such as its type. By way of example, the server may be arranged to trigger an inquiry, depending on circumstances, either four or 16 days after the normal time for triggering an inquiry. It is assumed below that it is necessary to send a complaint.

With reference to FIG. 2, in a step 42, a complaint message 45 is prepared by the server using an example or template 44 that the server 10 selects from templates that correspond to predetermined types of situation (lateness, inquiry, spoilage, damage, package unfindable, etc.). Each of these templates in electronic format has fields that are automatically filled in by the server 10 using the data about the package that is available in the database 12. The complaint includes in particular one or more details about the carrier 6.

In a step 46, the server 10 sends a message to the seller 4, i.e. the client of the service made available by the invention, the message is sent over the network 22 and invites the seller to use the web site of the controller 8 to confirm draft complaint messages relating to various packages, as set out in a list, and invites the seller to consult these drafts. In order to confirm and instruct the sending of these messages in step 47, if approved, the client 4 has two methods available. Each message may be validated manually, which assumes that the seller 4 controls the seller's server 14 so that it in turn causes the server 10 to send a message. By way of example, the seller may validate the sending of each complaint in a dialog box. Otherwise, the seller 4 may opt for fully automatic sending that enables the seller to validate the sending of a plurality of complaints in succession and en masse to the carrier 6 on the basis of a single initial order. This method avoids manually confirming each complaint, which can become time consuming. It is also possible to envisage that the sending of complaints is completely automatic without there being any need for the client to issue an order to validate such sending.

In a step 48, the complaint messages 45 are sent by email or fax or possibly by post as a registered letter, or by telephone, etc. Provision may be made for the complaints to be sent in such a manner that the carrier 6 receives these messages as coming from the seller 4, possibly without the controller appearing in them, even though the messages were prepared and sent by the server 10.

During a following step 50, it is assumed that the carrier 6 sends a reply to the seller 4, who forwards it to the controller 2, or else the reply is sent directly to the controller.

Thereafter, the system 8 analyses the reply by computer in particular to extract data therefrom in automatic manner. In particular, the idea is to determine whether the carrier 6 has provided a positive outcome to the complaint that was sent.

Figure 7:
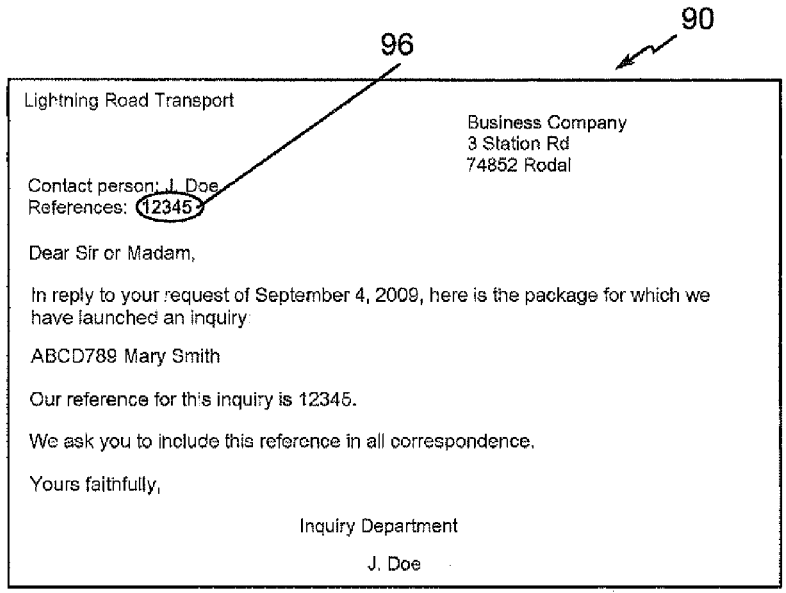
FIG. 7 is a diagram showing the implementation of the method while processing a document and a string of characters.
Figure 7:
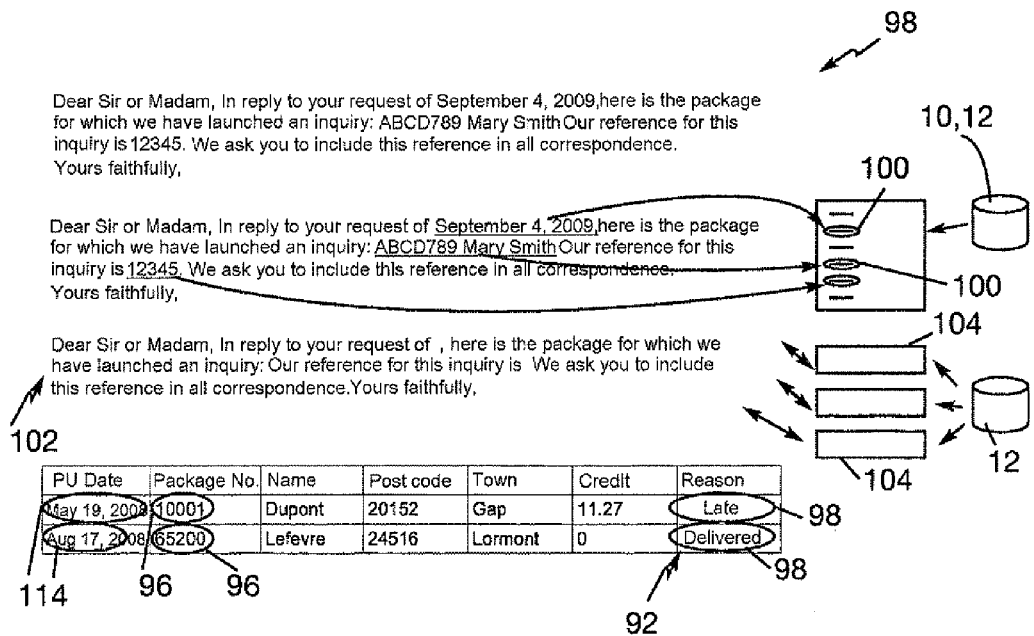
Figure 8:
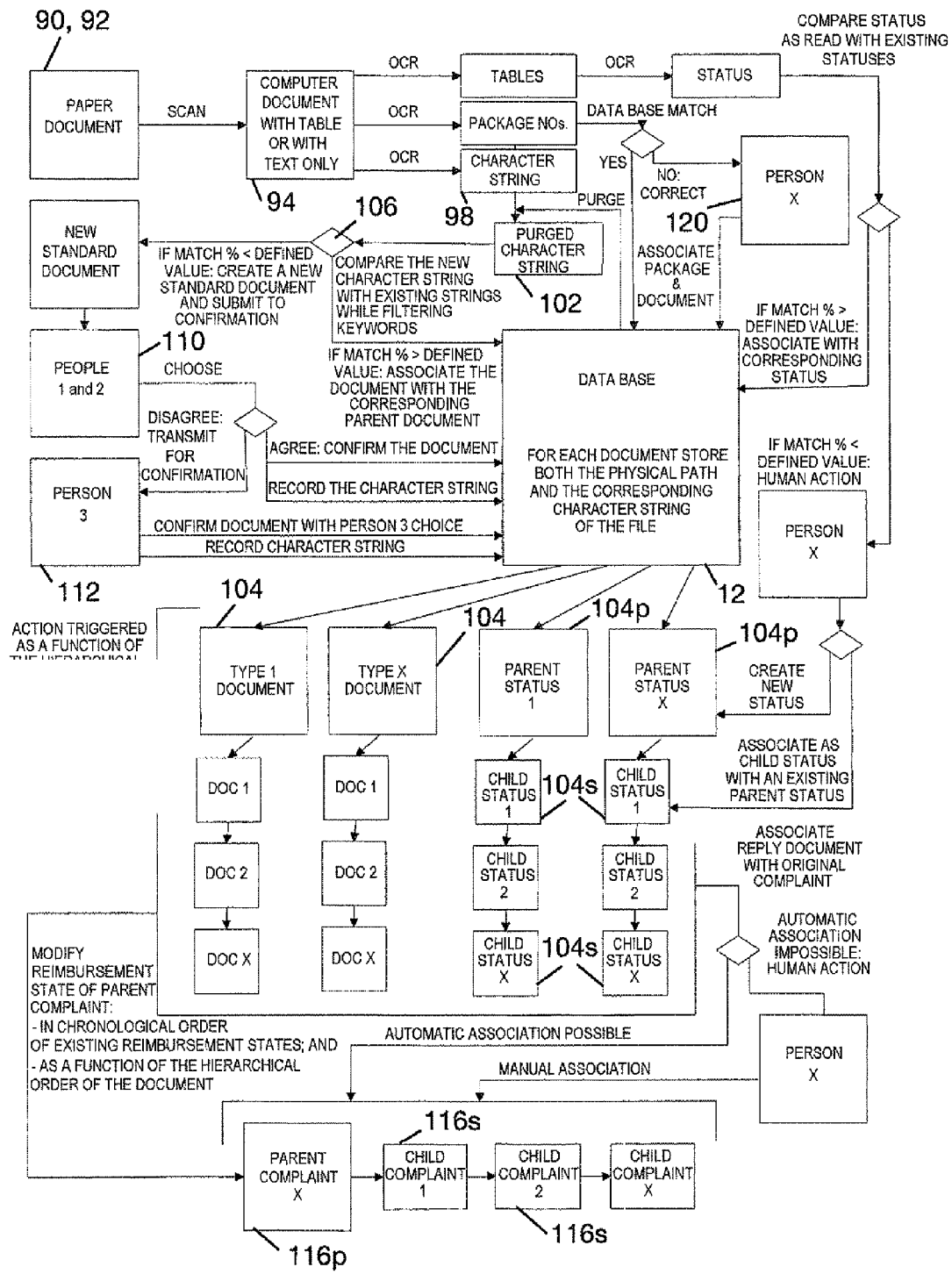
FIG. 8 is a flow chart showing the processing of documents in the context of the method.

This analysis as performed in the context of the method of the invention is described below in detail, in particular with reference to FIGS. 7 and 8.

These steps are implemented in particular by the computer 10 and the database 12. It is assumed that the controller receives various printed documents on paper media. For example these may be letters 90 containing text and/or documents such as summary sheets 92 containing one or more tables. A non-sorted group of documents of both of these types is transmitted to the processing means 10, 12. These documents are transmitted in their order of arrival and they are not previously organized as documents of a given type. There may thus be a letter 90 between two summary sheets 92, and vice versa.

The documents are scanned in bulk by the means 10, 12 so as to be converted into electronic form by an appropriate conventional coding method. Thereafter, the method involves only the electronic versions of the documents as obtained in this way. By way of example, scanning may be performed by means of a high resolution scanner.

For each electronic file corresponding to a document, the means 10, 12 begin by executing a step of comparing the file with at least two predetermined types of file. When a predetermined condition about file type is satisfied, the means perform a step of associating the file of the document with one or other of these types. Thus, when the means recognize that the digital file corresponds to a document of the letter type, the method continues with steps appropriate for a file of this type. The same is true when the document is a summary sheet including a table. Recognition of the type of the file by the means 10, 12 is of a conventional type and is not described in detail herein.

During the scanning step, the means 10, 12 perform a character recognition step, in particular for recognizing alphanumeric characters (digits, letters) or other types of character in the document.

It is assumed below that the file being processed corresponds to a letter.

During scanning, the means obtain a reference of least one article made up of characters and mentioned in the letter. In FIG. 7, this is the reference 96 which is indicated as being "12345". Package references are standardized so that the automatic means have no difficulty in identifying such a reference in the document.

During scanning, the same means also obtain a string of characters for the content of the letter. Since the file being processed is a letter, the means automatically eliminate certain portions of the document forming the beginning and the end of the letter. For example these may be the sender's letter-head and the destination address or indeed the signature and anything below it.

The means 10, 12 thus obtain a raw character string 98 that reads specifically as follows: "Dear Sir or Madam, In reply to your request of Sep. 4, 2009, here is the package for which we have launched an inquiry: ABCD789 Mary Smith Our reference for this inquiry is 12345. We ask you to include this reference in all correspondence. Yours faithfully,". This character string is made up of several sentences in this example.

During a subsequent step, the means 10, 12 eliminate from the raw string 98 one or more words or groups of words that are of a non-pertinent type. To do this, the means compare string fragments with words 100 or groups of words 100 of a predetermined type and recorded in the database 10, 12 in order to detect their presence in the string. For example, these may be variables such as names, forenames, addresses, dates, etc. In this example, these terms are underlined as follows "Dear Sir or Madam, In reply to your request of Sep. 4, 2009, here is the package for which we have launched an inquiry: ABCD789 Mary Smith Our reference for this inquiry is 12345. We ask you to include this reference in all correspondence. Yours faithfully,".

These are mentions that serve to personalize the content of the letter 90 and they do not contribute meaning to the method. Once these terms have been removed by the means 10, a character string 102 is obtained that is referred herein as the "purged" string insofar as the words or groups of words in question have been removed therefrom: "Dear Sir or Madam, In reply to your request of, here is the package for which we have launched an inquiry: Our reference for this inquiry is. We ask you to include this reference in all correspondence. Yours faithfully,".

Thereafter, the means 10, 12 compare the purged string 102 with templates 104 stored in the database 12. These templates are referred to as "documents" in FIG. 8. This comparison is performed over some number of templates that may be as great as several tens, several hundreds, or even several thousands or more. This comparison relates to the string of characters in the string 102 and the strings in the templates 104. The comparison of the string 102 with each of the templates 104 gives rise to calculating a match percentage between them. This percentage varies between 0% which means complete absence of any match (relatively rare) and 100% which indicates a perfect or absolute match (also relatively rare).

Specifically, for each template, the automatic means determine whether the purged string does or does not include a word or a group of words of a predetermined type referred to as "forbidden" with reference to the template. If one of these words or groups of words is present, then the match percentage is not calculated with that particular template and the means move onto the next template. If none of those words or groups of words is present in the string, then the match percentage is calculated. Thus, the automatic means calculate the percentage only when the purged string does not include any of the forbidden words or groups of words associated with the template. For each template, the words or groups of words that are forbidden in this way are defined beforehand.

This seeks to avoid confusion between certain templates that are too similar to one another and that would reach the required match percentage in spite of a major contradiction. For example, when considering a document of the letter type in which the carrier requests a commercial invoice, the content will be almost the same as if the carrier were requesting a shipping order. In contrast, the actions to be undertaken are completely different. Consequently, it is important to avoid making an association with a template that is not in fact suitable. For this purpose, the concept of a forbidden word serves to prevent a character string being associated with a template if a forbidden word is present in the character string (e.g.: if "order" is present in the character string, then it is not possible to select a template requiring a commercial invoice, which template has the word "order" identified as being a forbidden word).

In the present example, when the string 102 has at least one word or group of words of a predetermined "preferred" type, then the match percentage for each template that includes this word or group of words is increased. By way of example, such a word is the term "invoice" or "order". By way of example, each corresponding percentage may be increased by 3%. These words or groups of words are likewise recorded in the database so as to enable them to be compared with each of the portions of the string in order to determine whether they are present therein.

Thereafter, a test step 106 is performed. During this step, it is determined initially whether one of the match percentages exceeds a predetermined threshold value that is identified with a minimum. By way of example, this value may be set at 70% or 80%. If none of the percentages reaches this value, it is considered that the string 102 does not resemble any of the templates stored in the database and that human intervention is required. Otherwise, it is determined which of the percentages amongst those that do exceed the threshold is the greatest.

In this second situation, the device operates independently, i.e. it is capable of analyzing the document to recognize a situation that is analogous to a known situation and to draw the necessary consequences therefrom. In the first situation, the method, exceptionally, requires human intervention in order to determine whether the document being processed may be considered to be similar to a situation that is already known or whether on the contrary it is a situation that is entirely new and that requires a new template to be created.

Every new situation that is encountered is thus subjected to analysis by at least one person, and preferably by at least two, in order to determine what actions need to be undertaken. It is thus possible to decide that the string 102 should be used for creating a new template 104 that is to be recorded in the database. The scope of the device in terms of managing replies and the actions to be carried out is thereby increased. It might well be felt that relying on human intervention to create a new model is constraining and liable to slow down launching or running the system given the number of new situations encountered. However, each template generally relates to tens, hundreds, or thousands of similar situations. A corresponding number of situations can then be processed automatically thereafter without human intervention when the documents being processed are once more found to be similar to a recorded template.

Nevertheless, recording a new template in the database gives rise to taking a non-negligible risk. Insofar as each recorded template determines the actions to be carried out for tens of thousands of situations, the human intervention involved in recording it must be as reliable as possible, since otherwise any error will propagate into as many documents as are associated with this template. That is why it is preferred to make use of a rigorous procedure. Thus, provision is made for the question of creating a new template to be subjected to two different people, such as directors, during a step 110. If they reach the same conclusion about creating a new template, then it is recorded in the database. If their decisions or opinions diverge, then the system submits the situation to a third person 112 who must then choose between the first two proposals made by the directors or else select another proposal. In any event, provision is made for the decision of the third director to be the decision that is accepted. If the new template calls for actions that have not previously been performed, then these are identified by one or more people prior to being programmed in the automatic means.

Although this does not apply to a preferred implementation, provision may be made for the comparison to be performed with main templates and with secondary templates as described below.

Here is it assumed that the scanned document is of the summary sheet type 92 and that it includes a table. The processing of the document and the steps performed by the means are identical to the above description concerning the text document 90, except for the following differences.

Here the means 10 scan the table 92 and identify as such each of its cells and the contents in each of them. It thus identifies package numbers 96 and pickup dates 114 that are associated therewith, and in each row associated with a package it identifies a character string that is to be processed. Specifically, the string 98 is the reason associated with the package. In the examples shown in FIG. 7, these strings are as follows: "late" and "package delivered" for different respective packages.

Each of these strings is processed in the same manner as the strings 98 and 102 are processed in the context of a text document. Provision may thus be made to eliminate non-pertinent words from the string in order to purge it. The string is compared with predetermined templates in the database, which templates also do not include conflicting forbidden words or groups of words. Here these templates 104 are referred to as "statuses" in FIG. 8. In this situation, the minimum percentage is set at 90% since the strings in question are relatively short. The percentage associated with each template may be increased if a preferred word is to be found in the string.

In addition, in particular with tables, the templates 104 are specifically organized as follows in the database 12. Some templates 104 are referred to as main templates or parent templates 104$p$, whereas others are referred to as secondary templates or child templates 104$s$. Each secondary template is attached to a main template. In contrast, a main template may have one or more secondary templates attached thereto, or it need not have any. Each secondary template is said to be "secondary" insofar as it includes only some of the characters of the string in the corresponding main template. Furthermore, the main template is the template that is the template closest thereto in the main template of the database.

If the match percentage identified at the end of the calculations is the match percentage between the string 102 and a main template 104$p$, then the main template is associated with the string and the means 10, 12 execute an action concerning the articles referenced 96 using this template.

If the percentage relates to the match between the string 102 and a secondary template 104$s$, then it is the main template 104$p$ to which the template 104$s$ is attached that is associated with the article reference. The means then perform an action relating to that reference using the main template as identified in this way.

In a preferred implementation, the comparison between the purged string and the templates in the database is performed as follows. The system begins by comparing the string with the main templates in order to economize resources. If this step enables one of the main templates to be selected, then no comparison is performed with the secondary templates. It is only in the event of this step not enabling a template to be selected that the system compares the string with the secondary templates in a second step. Unlike the strings of text documents, the strings that come from tables are relatively short, so there is no risk of degeneration given the required high level of match (90% as compared with 70% or 80% for text documents).

The set of templates in the database with which the string 102 is compared for a text document 90 is preferably different from the set used for making the comparison on the basis of a document 92 in the form of a table. This prior determination of the type of the document serves in particular to determine which templates in the database are to be used for comparison purposes. The same can apply for the sets of words or groups of words that are forbidden, preferred, or not pertinent. These sets are preferably determined by a person before the method is implemented by the automatic means.

Various techniques are described above for obtaining routing states from the carrier's information system. This assumes that at least in some circumstances a computer file that is obtained can be used directly as such in the method. Nevertheless, some carriers seek to make the stage of recovering routing states more complex by presenting them in image form. With such images, that frequently exist in electronic form only, the automatic means perform the same type of processing as that explained above for texts and for tables.

Thus, the means obtain at least one article reference made up of characters and at least one character string associated with the reference and constituting the routing state.

The database 12 includes routing state templates in recorded form and constituting firstly main templates or parent statuses and secondary templates or child statuses, each of which secondary template is associated with a single main template. The means calculate a match percentage between the string and each of the routing state templates.

The means determine whether at least one of the percentages exceeds a predetermined minimum threshold, and if so whether one of the percentages is greater than the others. If the greatest percentage corresponds to a main template, then the means associate the article reference with that template and execute an action by means of the template. If the highest percentage relates to a secondary template, the means associate the article reference with the main template to which the secondary template is associated, and act accordingly. If no condition concerning percentages is satisfied, i.e. if no template can be associated with the routing state, then a person is called on to examine the situation. This may lead to a new routing state template being recorded in the database.

The main routing states are collected in the following respective categories:

package not delivered: this comprises routing states for which it has not been possible to present the article to the recipient on a first occasion;

package delivered: these are routing states for which the package has already been the subject of a first presentation to the recipient. For routing states that are considered as being delivered, an additional classification is performed. A distinction is drawn between final delivery for routing states that confirm that the goods have been delivered to the recipient, the "intermediate delivery+4" state for routing states that are to be the subject of an inquiry if the routing state has not changed after a period of 4 days has elapsed in addition to the inquiry date, which is a function of the type of goods, or indeed the "intermediate delivered+16" state, for routing states that are to be the subject of an inquiry if there is no change in the routing state after a period of 16 days has elapsed since the inquiry date, which is a function of the type of goods; and SMS: this involves sending a message by email or by SMS (short message service) to the recipient and to the client using the service made available by the method.

Figure 4:
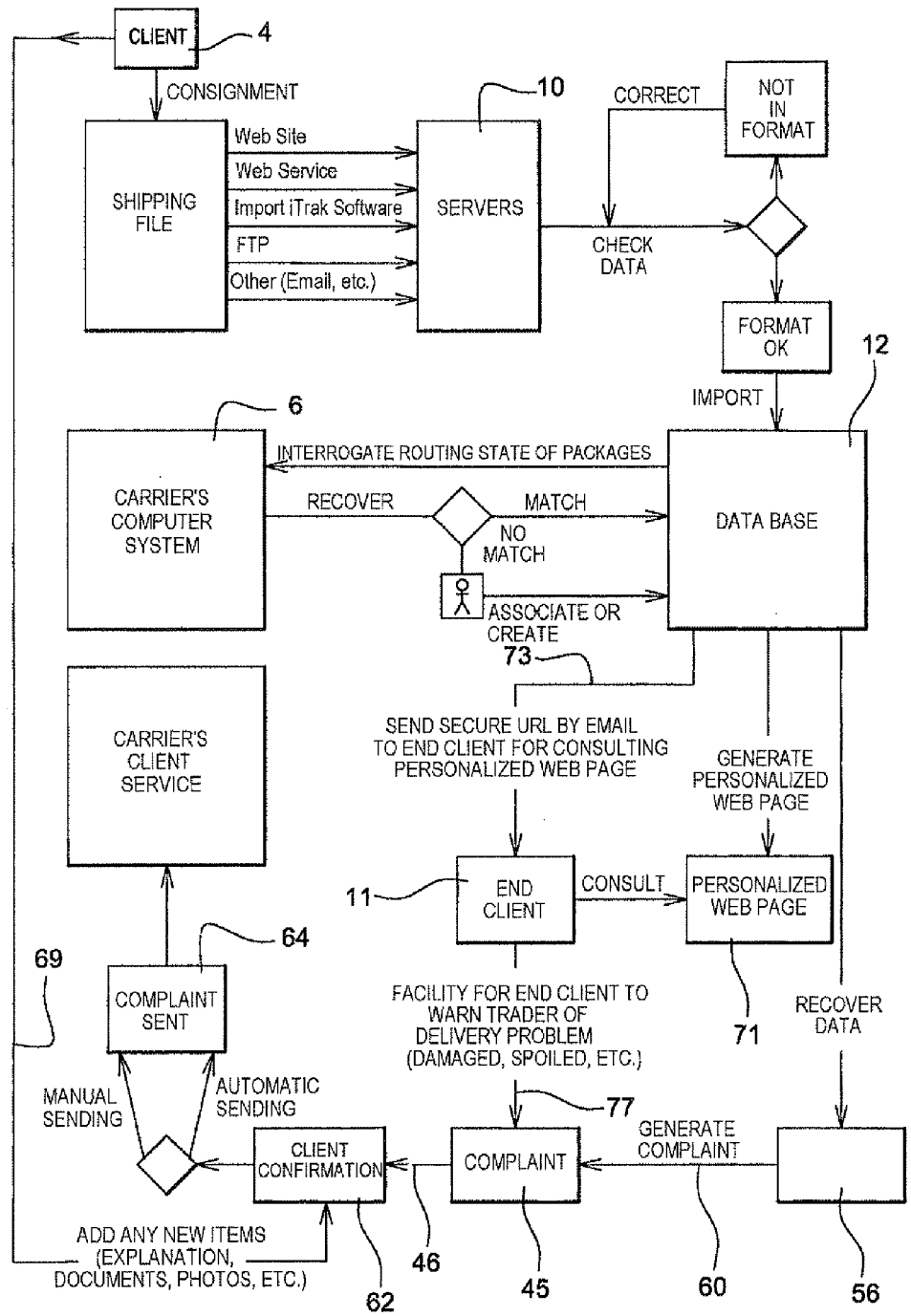
FIG. 4 is a flow chart analogous to FIG. 2 showing in particular the processing of carrier replies to complaints and putting a web page on line in the method of the invention.

With reference to FIG. 4, the carrier data obtained from the reply is verified by the server 10 and if anomalies are detected, the data is modified or corrected automatically by the server or else it is processed by a person, e.g. using an error management module that enables reading errors to be put right.

The data as obtained in this way and associated with the packages 9 is recorded in the database 12.

During a subsequent step 56, the system 8 analyses the reply and compares it with data already present in the database 12.

Where necessary, during a step 60, the system prepares a reply or an objection 45 for sending to the carrier 6 that is subsequently made available for confirming by the seller 4 during a step 62. As before, once the reply has been confirmed the system sends it to the carrier 6 during a step 64.

Figure 5:
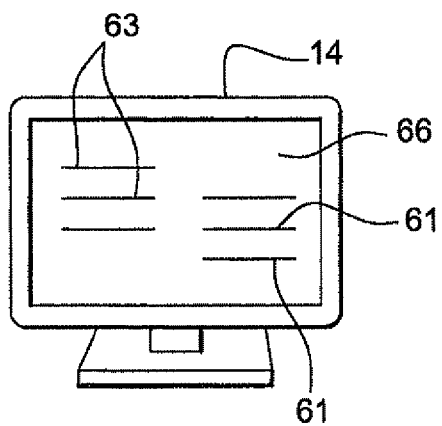
FIG. 5 is a view of a computer displaying the web page.

With reference to FIG. 5, in the present implementation, all or some of the data associated with a package 9 is made available remotely and on line to the seller 4 by means of a computer document such as a web page 66 that is made available on the network 22 by the system 8. The seller can thus consult this page from the seller's computer 14 and display it on the computer screen. Provision may also be made for the purchaser 11 to be able to access a similar page 71 from the purchaser's computer 67.

The page 66 presents both the data 63 relating to the package and coming from the seller 4 and the data 61 relating to the package and coming from the carrier 6. By way of example it comprises the following data or information:

the seller's package number;
the name and address of the purchaser 11;
the price and the weight of the package as declared or paid;
the routing states of the package;
the existence, and where appropriate the content, of any complaint that has been made with the carrier; and
any reply provided by the carrier together with any objections.

This page 66 constitutes a record enabling the seller to have fast and centralized access to all of the information relating to a package. Provision may be made for it also to provide optional information in the event of lateness or loss such as the number of days late, the inquiry number, etc. This page also enables the sender 4 to access all of the archived documents relating to a package, with the contents thereof being repeated in the summary record. The sender also has access to information enabling the purchaser to be informed very quickly, should that be necessary.

Provision may be made for this page to enable the seller to confirm sending of a complaint. However it is preferable for this page to make it possible only to initiate certain complaints of the damage, spoilage, wrong delivery, and NATA type, and a different page is used to send complaints singly, in bulk, or automatically.

As mentioned above, complaints such as inquiries for being out-of-time are initiated automatically by the server 10 addressed to the carrier 6. Nevertheless, certain anomalies cannot be detected automatically. This applies for example to packages being damaged or spoiled, unjustified returns to sender on NATA grounds, wrong deliveries, or lost packages. (There is a wrong delivery when the purchaser 11 has not received the package even though the carrier's on-line computer system indicates that the package has been delivered.) Under all circumstances, the seller 4 can act manually and remotely to initiate a complaint by means of the page 66 that forms an interface configured for this purpose. As shown in FIG. 4, in step 69, the seller 4 may use this interface to send documents such as photographs, copies of correspondence such as emails, a spoilage report, etc. The file as put on line in this way may be made accessible to the services of the carrier 6 or may be sent thereto. (For lost packages, it is nevertheless up to the seller to verify that the package exists and was indeed sent before requesting that a complaint be triggered in respect of the package. The seller must thus confirm that the package was or was not sent.)

The complaint is then prepared by the server 10 using templates adapted to the circumstances in question, as described above. The same interface enables the carrier to be requested to provide more detailed information about the delivery of the package, where appropriate.

There preferably exists one page 66 per package that is fully dedicated to that package. Also preferably, the seller 4 has a direct access URL (universal resource locator) web address made available to enable the seller to open the desired package record directly without needing to enter an identifier or to search for data concerning the package on the Internet site of the controller 2. For this purpose, the system sends an email to the seller containing the URL address in question.

Provision may also be made for the system not to send sellers an email for each package, but rather to send each seller a URL enabling that seller to make use of the URL at the seller's own installation by adding a package number to its end so that it points directly to the package record of interest.

The system 8 generates the page 66 and puts it on line, and then modifies it to keep it regularly up to date, e.g. on a daily basis, as a function of updated information about packages.

Provision is also made specifically for the system 10 to make a page 71 available on line that is analogous to the page 66 and for remote consultation by the purchaser 11. The purchaser in turn thus has a high level of tracking information that is available. It is possible to personalize this page for each of the sellers 4. In this situation also, it is preferable to make a direct access URL web address available for the purchaser 11 so that the purchaser can act directly to open the desired package record without needing to enter an identifier or to search for package data on the Internet site of the controller 2. For this purpose, in step 73, the system sends an email to the purchaser containing the URL address in question.

To do this, when the sender 4 loads sending states into the system 8, an email address for the purchaser 11 is included in each package row in addition to other data such as shipping date, name, forename, and address of the recipient, etc.

The information on the page 71 may be organized in four groups or boxes on the page as follows:

- information relating to the package 9 such as data relating to the carrier of the package, contracted delivery times, the tracking number (e.g. with a link to the carrier's package page), shipping date, the recipient, and the recipient's address;
- a history of all of the routing states of the package, including its various successive states. When a new state is added, it does not replace a preceding state but lengthens the list. This enables the purchaser to view all of the routes followed by the package through the carrier's network;
- information about delivery: when the package has been shipped, the box gives the expected delivery date, i.e. the day on which the package ought theoretically to be delivered if the carrier complies with the contracted time. This date is purely indicative, since the package may be delivered after or before that date. If delivery time is abnormally long, i.e. specifically after an inquiry has been opened, the page informs the purchaser 11 that an anomaly has been detected during delivery and that an inquiry has been opened by the sender (using the system 8) with the carrier. Furthermore, the purchaser is invited to make contact with the seller's client service only as from a date specified in the box. It is from this date that the sender will be best able to inform the purchaser about the anomalies that have occurred since shipping; and
- an information module in the event of a problem on reception of the package such as damage, spoilage, a wrong delivery, etc. If the purchaser is confronted with one of these problems, the module made available to the purchaser provides the procedure to be followed depending on the incident in question.

As shown in FIG. 4, in step 77, provision may be made for the page 71 to enable the purchaser to warn the seller of an anomaly. The seller can then use the seller's page 66 to request the preparation and sending of a complaint.

The seller's page 66 may have content that is similar.

The main templates are classified in a hierarchical order and identified by an order number making it possible either to create a standard reply by using a shell or "boilerplate" that is personalized as a function of requirements and proposed for sending to the controller's client, or else to launch some particular action in order to inform its clients about the situation encountered.

The hierarchical order given also makes it possible to track progress of the complaints that are open with the carrier and that may for example run through the following six states: (0) "no information"; (1) "ongoing"; (2) "waiting for documents"; (3) "disagreement"; (4) "waiting for reimbursement"; (5) "final refusal"; and (6) "reimbursed". The hierarchical order enables the state of the complaint to progress towards one of these states and as a function of the correspondence that is associated therewith. For example, the templates of hierarchical order number lying in the range 1 to 100 are associated with the state (1) "ongoing". Provision is made for the complaint states never to regress, so as to force an outcome on the complaint. Thus, if the state of a complaint is (2) "waiting for documents", it is no longer possible for it to go back to the state (1) "ongoing", even if an analysis of a document identifies as pertinent a template having a hierarchical order that points to that state. Under such circumstances, no action is undertaken since the information in the database is against such action given the state of advance of the complaint. The method thus makes it possible by cross-checking data to determine as a function of the received document and of the state in which the complaint is to be found what actions should be undertaken, such as sending a reminder, given the lack of any reply within a time period, waiting for documents to be transmitted, etc.

In the event of multiple complaints for the same case, it is important to know which complaint is answered by a received document in order to update its state in the database. That is why a distinction is drawn between two types of complaint, i.e. main or parent complaints 116*p* and secondary or child complaints 116*s*. Secondary complaints are not associated with a state of advance since they are merely a consequence of a main complaint. Provision is made for a document associated with a secondary complaint to update the associated main complaint. Specifically, the means are suitable for recognizing the complaint to which a document should be attached. For this purpose they use a unique nomenclature for each type of declaration. If the document is considered as being capable of replying to only certain types of complaint, the means are suitable for associating the document with the appropriate complaint. In the event of a conflict, human intervention enables the appropriate association to be made.

Certain errors cannot be tolerated when reading documents by character recognition, in particular errors concerning package numbers that are used for associating the document or a row of the table with the package under consideration and with the complaints in question. Assuming that there is a read error concerning the package number, then the automatic means generate an error that requires human intervention, as mentioned in step 120 of FIG. 8.

Provision may also be made for the method to incorporate taking account of the shipping order of the recipient. Thus, after the order has been subjected to character recognition, the means search for a match for the client number, the order number, and the shipping date on the shipping order with the data in the database. If these criteria are satisfied, the shipping order is incorporated on behalf of the client. If an error is generated, provision is made for human intervention.

When the carrier issues an invoice to the sender, the invoice often summarizes a set of that sender's shipments. Each shipment is identified by its tracking number, its weight as calculated during routing, and the invoice price that stems therefrom. (When the sender hands over packages to the carrier, the sender declares a weight and a price as calculated by the sender's own services, and these are then recorded in the database of the system 8.) When the carrier 6 observes an anomaly, provision may be made for this to be the subject of a reduction in the invoice for carrier services sent to the seller 4. Alternatively, the carrier 6 may send a reimbursement to the seller 4. All of the necessary data is sent for this purpose by means of the method to the carrier's services. Once the reply from the carrier has been received, it is analyzed by the system 8. If the indemnification has been granted, the procedure is closed. Otherwise, the server 10 once more cross-checks the available information. If it appears that there does indeed exist a delivery that is contractually out of time, then the server 10 prepares a reminder message for sending to the carrier, presenting this message beforehand to the seller for confirmation, and, once it has been confirmed, sending it, possibly together with documents proving the lateness.

The method also makes it possible to analyze the content of these invoices and to provide the sender 4 with a list of packages that have been over-invoiced above an adjustable threshold. This principle is implemented as follows.

Figure 6:
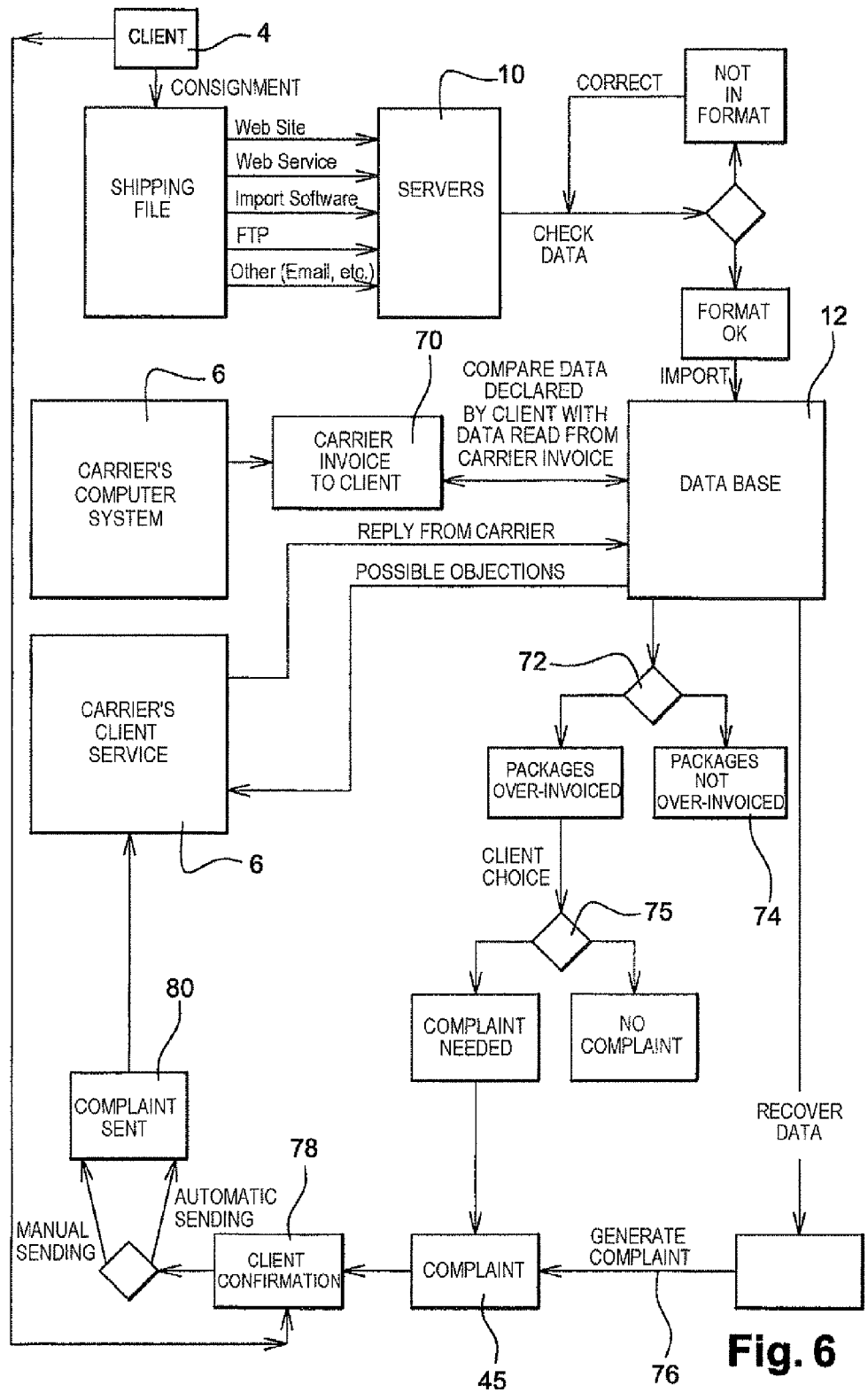
FIG. 6 is a flow chart analogous to FIG. 2 showing how the method runs in order to detect an anomaly in the carrier's invoicing.

With reference to FIG. 6, in a step 70, the carrier's invoice obtained by the controller 2 is analyzed in order to extract pertinent data therefrom in the same manner as that described above, which data is optionally checked and possibly even corrected.

The data is recorded in the database 12 of the system 8.

During a step 72, the system analyses whether the invoicing is excessive compared with that which was expected, i.e. whether or not the routing of the package has been over-invoiced. For this purpose, it compares data from the seller with data from the carrier.

In step 74, if it appears that the shipping has not been over-invoiced, the analysis comes to an end.

If it has been over-invoiced, then in a step 75 the system 8 determines whether or not this question itself requires a complaint message to be prepared. This determination may in particular depend on a choice made by the seller 4.

Where appropriate, the system 8 acts as described above to prepare a complaint message 45 during a step 76, and makes it available to the seller for confirmation in a step 78, and subsequently, where appropriate, sends it to the carrier 6 in a step 80. The seller can thus examine whether or not the over-invoicing is justified. This confirmation does not occur when a simple inquiry is being opened, for example, given that information is available about the routing state that confirms that the consignment is real.

Preferably, the method makes provision for each complaint file to remain open so long as the reduction or reimbursement has not been observed on a basis of data relating to an invoice sent by the carrier, and unless there are legitimate reasons for closing the complaint.

Thus, the method enables the seller 4 to be assured that the carrier's invoice matches the data that has been obtained by the system 8. In parallel, provision may be made for the seller 4 to have an interface available on the controller's site enabling the seller to draw up lists of packages that the seller believes have been over-invoiced by the carrier. This makes it possible, if the seller so desires, to request that a complaint be opened with the carrier in order to obtain more ample information about each of the invoicing anomalies.

If the seller so desires, the method also enables the seller in turn to make undertakings with purchasers concerning delivery dates, by proposing an indemnification service using indemnification ensured upstream by the carrier since it is the carrier who makes undertakings on delivery dates and indemnifies shipping expenses when out-of-time. The method of the invention thus enables the seller to pass on to the purchaser an indemnification for delivery out of time, if the carrier has not complied with the carrier's contractual undertakings. This is done automatically in full or in part as follows:

- as mentioned above, the seller daily uploads a list of shipments to the system 8;
- the system 8 sends a shipping note by email to the purchaser 11 containing the secure URL address that leads to the web page 71, e.g. a page belonging to the seller or dedicated to the seller;
- on this page, the purchaser 11 can follow the routing history of the package with the predicted delivery date, the delivery anomalies detected by the system 8, etc.;
- if the purchaser does not receive delivery in good time from the carrier, the system 8 prepares a request for indemnification from the services of the carrier, as described above;
- the system 8 puts on line and keeps up to date the list of purchasers having packages that have been delivered out of time. Thus, the system 8 informs the sender 4 of the list of all of that sender's recipients entitled to indemnification because of a delivery out of time. By way of example this list is made accessible to the sender on a web page put on line by the system;
- the sender sends a reimbursement note to the purchaser and performs the reimbursement itself by bank transfer, sending a check, etc.; and
- the carrier indemnifies packages that are out of time with the seller, e.g. in the form of credit notes.

The method of the invention enables the handling of delivery incidents to be improved, which handling takes place very soon after incidents appear and without waiting for a possible alert from the purchaser in question.

In the method, the system verifies the routing of all of the packages shipped, directly by means of data available on the carrier's web site or on its own computer system without passing via the carrier's web site. Implementation of the method is automatic and does not require action on the part of the seller 4 other than sending data relating to that seller's packages and possibly confirming the sending of complaints, when such complaints are not sent automatically.

The sender 4 has no need to wait for being alerted by the purchaser in the event of an anomaly. This leads to a precious saving in time. The seller is also in a position to inform a purchaser who has suffered an anomaly that an inquiry has already been opened or that a complaint has already been sent. The purchaser is thus reassured on discovering that the seller 4 is closely monitoring its shipping and has already taken action upstream in an attempt to solve the problem.

This method also makes it possible to track the indemnification procedure stemming from a package being late or lost.

The invention enables the tasks that need to be performed to be presented in an organized manner while also making the necessary documents available in dematerialized manner. In particular, after the documents have been analyzed, two solutions may be envisaged. If indemnification is granted, the procedure waits for the reimbursement. Otherwise, the automatic means once more cross-check all of the information in the database. For example, if it is found that delivery has indeed taken place outside the contracted period, the carrier's reply is contested and a reminder is sent to the carrier together with documents proving the lateness. The procedures are thus tracked until the file is closed, with procedures being centralized together with documents in the database. The procedures are not closed until indemnification is observed on the carrier's invoice. It can thus be seen that the invention enables a complete memory of the various files to be established in the database because of the way information is recorded from the documents that are processed in succession. The processing of a document gives rise to three actions. The first action is to put the scanned document into the database in association with key information that has been recognized as a result of the scanning (the purpose of the document, the number of the file, the package, name, etc.). Thereafter, once the means have interpreted the reply from the party concerned, a search is made in the database for earlier documents relating to the file in question. This search enables information to be recovered that is needed for preparing the reply. Finally, the system generates the appropriate reply as a function of the information available to it. And anything that the system has accepted during the procedure is subsequently available for use in a similar procedure.

Naturally, numerous modifications may be made to the invention without going beyond the ambit thereof.

Provision may be made for the web pages that are made available on line for the seller and for the purchaser to be distinct or to be the same.

The invention claimed is:

1. A method of processing non-digital documents relating to a shipped package, the method comprising:
   shipping a package by a carrier; and then
   receiving by the carrier a complaint about the shipping of the package; and then
   responding by the carrier to the complaint and making available by the carrier at least one non-digital document comprising data relating to the response by the carrier to the complaint about the shipment of the shipped package; and then
   converting at least one non-digital document made available by a carrier of the shipped package into a digital document, the digital document being distinct from the shipped package and comprising data relating to a shipment of the shipped package; and then
   performing character recognition to identify characters in the digital document; and then
   searching the digital document for at least one package reference made up of the characters; and then
   obtaining the at least one package reference;
   obtaining at least one string of the characters associated with the package reference and distinct therefrom; and then
   calculating respective match percentages between a sequence of characters of the string of characters and one or more sequences of characters of templates in a database, the templates being digital documents; and then
   determining whether at least one of the percentages satisfies at least one predetermined condition; and
   when the condition is satisfied, associating the package reference with a template of the database relating to the percentage, and executing an action concerning the package reference or the complaint from the associated template.

2. A method according to claim 1, wherein the method further comprises comparing the digital document with at least two predetermined document types, and when a predetermined condition concerning the document types is satisfied, associating the digital document with one of the types.

3. A method according to claim 1, wherein the character recognition is performed in a text.

4. A method according to claim 1, wherein the character recognition is performed in a data table.

5. A method according to claim 1, wherein the character recognition is performed in an image.

6. A method according to claim 1, wherein, when the string includes at least one word or group of words of a predetermined non-pertinent type, the method further comprises eliminating the word or the group of words from the string before calculating the percentages.

7. A method according to claim 1, wherein, when the string includes at least one word or group of words of a preferred type, the method further comprises increasing at least one of the percentages prior to determining whether at least one of the percentages satisfies at least one predetermined condition.

8. A method according to claim 1, wherein determining whether at least one of the percentages satisfies at least one predetermined condition comprises determining whether at least one of the percentages exceeds a predetermined threshold.

9. A method according to claim 1, wherein determining whether at least one of the percentages satisfies at least one predetermined condition comprises determining whether at least one of the percentages is greater than another one of the other percentages.

10. A method according to claim 1, wherein the templates in the database comprise main templates and secondary templates, each secondary template being associated with a single respective one of the main templates and each secondary template containing only some of the characters of the main template with which the secondary template is associated, and further comprising determining when a match percentage between the string and one of the secondary templates satisfies the condition, the association comprising associating the package reference with the main template with which the secondary template is associated.

11. A method according to claim 1, wherein, when the predetermined condition is not satisfied, the method further comprising recording the string in the database as a template.

12. A computer program recorded on a non-transitory computer readable medium, the computer program including code instructions for controlling the execution of a method according to claim 1, when executed by a computer.

13. A method according to claim 1, wherein the complaint relates to at least one of lateness of the shipped package, damages to the shipped package and an address of a recipient of the shipped package.

14. A system for processing documents, the system comprising:
   a conversion subsystem including a device configured to convert at least one non-digital document from a carrier of a shipped package into a digital document, the digital document being distinct from the shipped package and comprising data relating to a shipment of the shipped package, the shipped package shipped by the carrier, and then the carrier receiving a complaint about the shipped package, and then the carrier responding to the complaint and making available at least one non-digital document comprising data relating to the response by the carrier to the complaint about the shipment of the shipped package; and
   an analysis subsystem including a processor configured to then:
      recognize characters in the digital document; and then
      search the digital document for at least one package reference made up of characters; and then
      obtain the at least one package reference; and then
      obtain at least one string of the characters associated with the package reference and distinct therefrom; and then
      calculate respective match percentages between a sequence of characters of the string of characters and one or more sequences of characters of templates in a database, the templates being digital documents; and then
      determine whether at least one of the percentages satisfies at least one predetermined condition; and then
      when the condition is satisfied, associate the package reference with a template of the database relating to said percentage, and execute an action concerning the package reference or the complaint from the associated template.

15. A set, comprising a device according to claim 14 and a database relating to shipped package, wherein the database comprises a non-transitory computer readable medium containing in recorded form:
- the package references made up of characters converted from the at least one non-digital document, and
- the templates comprising sequences of characters and defined by main templates and secondary templates, each secondary template being associated with a single respective one of the main templates and each secondary template including only a portion of the characters of the main template to which the secondary template is associated, the main templates and secondary templates being digital documents.

16. A database relating to a shipped package, the shipped package shipped by the carrier, and then the carrier receiving a complaint about the shipped package, and then the carrier responding to the complaint and making available at least on non-digital document comprising data relating to the response by the carrier to the complaint about the shipment of the shipped package, wherein the database comprises a non-transitory computer readable medium containing in recorded form:
- package references made up of characters converted from at least one non-digital document to a digital document, the package references relating to the shipped package and comprising data relating to a shipment of the shipped package, the digital document being distinct from the shipped package; and
- templates comprising sequences of characters and defined by main templates and secondary templates, each secondary template being associated with a single respective one of the main templates and each secondary template including only a portion of the characters of the main template to which the secondary template is associated, the main templates and secondary templates being digital documents, and the templates defining an action concerning one or more of the package references or the complaint from the associated template to be performed.

* * * * *